United States Patent [19]

Kinashi et al.

[11] 4,339,783

[45] Jul. 13, 1982

[54] ALTERNATING CURRENT CORONA DISCHARGE APPARATUS

[75] Inventors: Hiroshi Kinashi, Uji; Yoshihisa Miwa; Shoshichi Kato, both of Yamatokoriyama; Hiroyuki Kawataki, Kakogawa, all of Japan

[73] Assignees: Sharp Kabushiki Kaisha, Osaka; Yahata Electric Works Ltd., Kakogawa, both of Japan

[21] Appl. No.: 32,028

[22] Filed: Apr. 20, 1979

[30] Foreign Application Priority Data

Apr. 21, 1978 [JP] Japan ................................ 53-48082

[51] Int. Cl.[3] .............................................. H02H 9/00

[52] U.S. Cl. .................................. 361/235; 250/324; 250/326; 355/3 CH; 355/14 CH; 361/230

[58] Field of Search .............. 355/3 R, 3 CH, 14 CH, 355/14 R; 361/229, 230, 235, 56; 250/324, 325, 326

[56] References Cited

U.S. PATENT DOCUMENTS

| | | | |
|---|---|---|---|
| 2,965,755 | 12/1960 | West | 250/325 |
| 3,076,092 | 1/1963 | Mott | 355/3 CH X |
| 3,414,769 | 12/1968 | Hoffman | 361/235 |
| 3,518,489 | 6/1970 | Musham | 361/56 |
| 3,736,494 | 5/1973 | Rosenthal et al. | 250/324 X |
| 3,793,535 | 2/1974 | Chowdhuri | 361/56 X |
| 4,068,279 | 1/1978 | Byrnes | 361/56 |
| 4,140,962 | 2/1979 | Quinn | 355/3 CH X |
| 4,156,141 | 5/1979 | Tolmie | 250/324 |
| 4,183,653 | 1/1980 | Satomi et al. | 355/3 CH X |
| 4,232,235 | 11/1980 | Faust et al. | 361/56 X |
| 4,268,161 | 5/1981 | Nakahata et al. | 355/3 CH |

*Primary Examiner*—Fred L. Braun
*Attorney, Agent, or Firm*—Staas & Halsey

[57] ABSTRACT

An electrophotographic apparatus employs an alternating current corona discharge apparatus for the purpose of forming an electrostatic image on a photosensitive member. The alternating current corona discharge apparatus has a transformer for transforming or stepping up the alternating current source voltage, the secondary winding of which is connected to the ground at one end. The secondary winding is shunted by a series connection of a first plurality of varistors. A smaller second plurality of series connected varistors selected from the first plurality of series connected varistors are shunted by a first diode-resistor series connection of a diode with the cathode on the ground side and a variable resistor and a smaller and third plurality of different series connected varistors selected from the first plurality of series connected varistors are shunted by a second diode-resistor series connection of a diode with the anode on the ground side and a variable resistor. The non-grounded end of the secondary winding is connected to a wire electrode of the corona discharge apparatus and the grounded end of the secondary winding is connected to a shield plate enclosing the wire electrode.

27 Claims, 14 Drawing Figures

ALTERNATING CURRENT CORONA DISCHARGE APPARATUS

BACKGROUND OF THE INVENTION

1. Field of the Invention

The present invention relates to an alternating current corona discharge apparatus. More specifically, the present invention relates to an alternating current corona discharge apparatus particularly suited for an electrophotographic apparatus.

2. Description of the Prior Art

A corona discharge apparatus comprises a thin wire electrode and a shield plate enclosing the wire electrode and a high voltage of the order of several kV is applied between the wire electrode and the shield plate. It has been observed that generally uniform ion discharge is achieved along the wire electrode on the occasion of the positive corona discharge where the positive high voltage is applied to the wire electrode whereas a glow spot is likely to occur on the wire electrode on the occasion of the negative corona discharge where the negative high voltage is applied to the wire electrode so that a uniform ion discharge is not achieved. Such trend is seen even in an alternating current corona discharge apparatus wherein the positive corona discharge and the negative corona discharge are repeated alternately for each half cycle and thus uniform ion discharge is difficult to attain in the negative half cycle corona discharge. When a charge is imparted onto a member being charged such as a photosensitive member of an electrophotographic apparatus as a result of such non-uniform ion discharge, then an electric charge on the surface of the member being charged becomes non-uniform.

In order to eliminate such uneveness of the surface charge on the member being charged caused as a result of the negative corona discharge, it has been proposed that the negative high voltage being applied to the wire electrode be increased in the negative direction to make more dense the glow spot and also to increase the corona current so that uneveness of the surface potential on the member being charged is reduced. However, such an approach for increasing the voltage being applied to the wire electrode involves an upper limit voltage by virtue of a fear of a spark discharge and leakage. In addition, it has been observed that an increase of the voltage being applied as the discharge voltage causes a high frequency component of a large peak value in superposition on each peak in the positive direction and in the negative direction of the waveform of the corona discharge current. Such phenomenon uniquely occurs when a corona discharge apparatus is used as a load. Such high frequency component becomes a cause of an unstable discharge and an increased discharge voltage considerably increases the instability of the discharge.

SUMMARY OF THE INVENTION

Briefly described, the present invention comprises an alternating current power supply apparatus for applying a high alternating current voltage to a wire electrode of an alternating current corona discharge apparatus, which comprises means for limiting the alternating current waveform at a predetermined peak value.

According to the present invention, the alternating current waveform of a high alternating current voltage being applied to a wire electrode of an alternating current corona discharge apparatus is limited at a predetermined value without substantially varying the effective value of the high alternating current voltage being applied to the wire electrode. Therefore, an unfavorable influence caused by a high frequency component in superposition on the peak portion of the corona discharge current in the positive and negative directions can be effectively eliminated.

In a preferred embodiment of the present invention, the peak value as limited for the negative half cycle of the high alternating current voltage is selected to be relatively larger than the peak value as limited for the positive half cycle of the high alternating current voltage. Therefore, non-uniform ion discharge by the negative half cycle corona discharge is improved. If and when such alternating current corona discharge apparatus is employed in an electrophotographic apparatus, a clear copy without uneven density can be provided.

Therefore, a principal object of the present invention is to provide an improved alternating current corona discharge apparatus.

Another object of the present invention is to provide an alternating current corona discharge apparatus that is capable of achieving corona discharge of a high stability.

A further object of the present invention is to provide an electrophotographic apparatus employing an improved alternating current corona discharge apparatus.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are graphs for explaining the effect of the present invention, wherein FIG. 5A shows a surface potential of a member being charged without the present invention and FIG. 5B shows a surface potential of a member being charged with the present invention;

DESCRIPTION OF THE PREFERRED EMBODIMENTS

Figure 1:
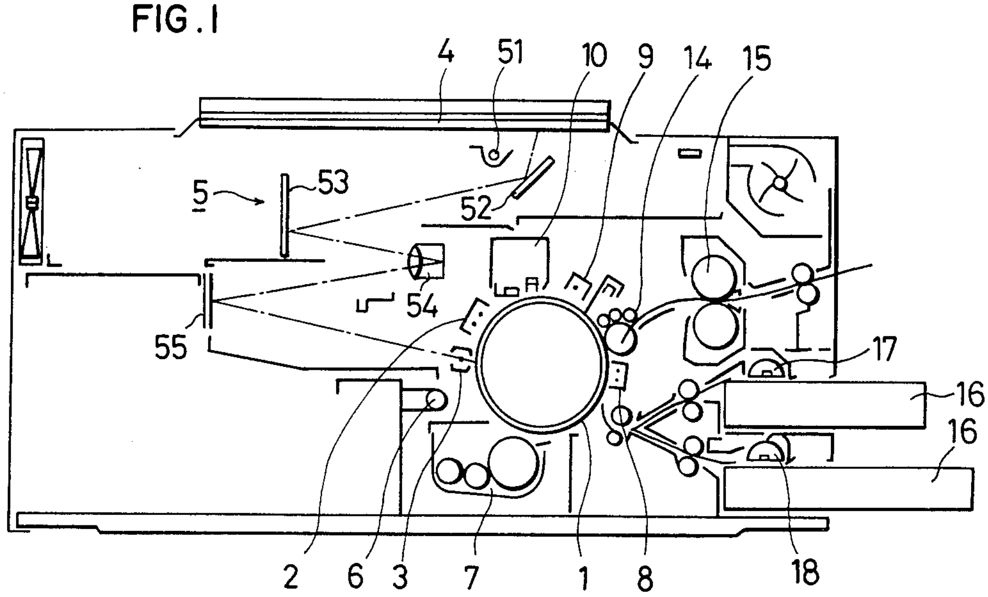
FIG. 1 is a diagrammatic view of one embodiment of an electrophotographic apparatus wherein the present invention can be advantageously employed.

FIG. 1 is a diagrammatic view of one example of an electrophotographic apparatus in which the present invention can be advantageously employed. Since the structure and operaton of such an electrophotographic apparatus is well known to those skilled in the art, an outline of the structure and operation of the FIG. 1 electrophotographic apparatus will be described in the following. A full disclosure of such electrophotographic apparatus as shown in FIG. 1 is seen in U.S. Pat. No. 3,666,363, issued May 30, 1972 to Hiroshi Tanaka et al, entitled "ELECTROPHOTOGRAPHIC PROCESS AND APPARATUS", and in the corresponding British Pat. No. 1,165,406 and the corresponding German Pat. No. 1,522,568, and these patents are incorporated herein by reference thereto. The electrophotographic process and apparatus disclosed in the above referenced U.S. Pat. No. 3,666,363 comprises three major steps for forming an electrostatic image on a photosensitive member 1. As to be more fully described subsequently, the first step comprises the step of uniformly charging the photosensitive member 1 and to that end a direct current corona discharge apparatus 2 is provided close to the surface of the photosensitive member 1. The second step comprises the step of focusing an optical image of an original copy placed on an original copy table 4 through an optical system 5 on the photosensitive member 1 while removing the electric charge on the surface of the photosensitive member 1 by means of an alternating current corona discharge. To that end, an alternating current corona discharge apparatus 3 is provided. The third step comprises the step of uniformly illuminating the photosensitive member 1 and to that end a post lamp 6 such as a fluorescent lamp is provided.

The optical system 5 comprises a lamp 51 for illuminating the original copy table 4, a first movable mirror 52 for focusing an optical image of the original copy, a second movable mirror 53, a fixed mirror lens 54 and a fixed mirror 55. The lamp 51 and the first movable mirror 52 are provided to be movable in parallel with the original copy table 4, so that the lower surface of the original copy placed on the original copy table 4 is optically scanned. The second movable mirror 53 is provided to be movable in parallel with the first movable mirror 52 at the speed of a half of the speed of the first movable mirror 52, so that the length of the light path from the surface of the original copy placed on the original copy table 4 to the surface of the photosensitive member 1 may be constant. Such optical system 5 is disclosed in more detail in U.S. Pat. No. 3,330,181 issued July 11, 1978 to H. Jakobson, entitled "SURFACE EXPOSURE DEVICE FOR COPYING APPARATUS", and this patent is incorporated herein by reference thereto.

Figure 2:
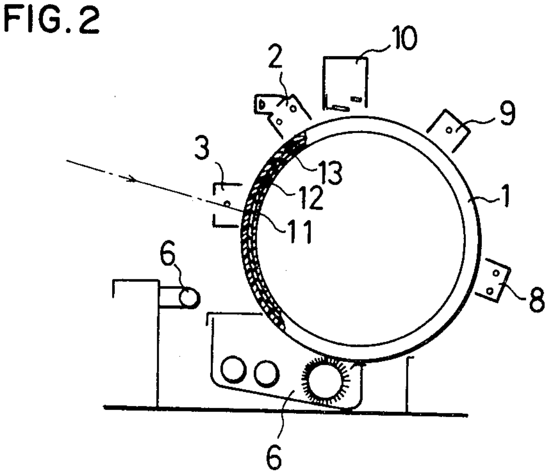
FIG. 2 is a diagrammatic view showing in more detail a major portion of the FIG. 1 apparatus.

As better seen in FIG. 2, the photosensitive member 1 comprises a photoconductive layer 12 of such as CdS deposited on a conductive support member 11 and a transparent highly insulating film 13 coated thereon, with the conductive support member 11 grounded. As shown in the above referenced U.S. Pat. No. 3,666,363, a positive electric charge is first imparted on the highly insulating film 13 of the photosensitive member 1 through a positive corona discharge by means of the direct current discharge apparatus 2. At the same time, the photosensitive member 1 is irradiated with a weak light beam. As a result, the resistance value of the photoconductive layer 12 is decreased and a negative electric charge on the highly insulating film 13 as attracted by the positive electric charge reaches the surface of the highly insulating film 13 through the photoconductive layer 12 the resistance value of which has been partially decreased. The photosensitive member 1 is exposed to the light image through the optical system 5, while alternating current corona discharge is performed by means of the alternating current corona discharge apparatus 3. Then a portion of the photosensitve member 1 as exposed to the light, i.e. a light portion on the photosensitive member 1 gives rise to a decrease of the resistance value of the photoconductive layer 12, while a portion of the photosensitive member 1 as not irradiated with the light, i.e. a dark portion of the photosensitive member 1 maintains a large resistance value of the photoconductive layer 12 serving as an insulating layer. Therefore, an electrostatic capacitance is increased in the light portion and the quantity of a negative electric charge by the alternating current corona discharge increases as compared with that of the dark portion, whereby the positive electric charge as charged in the above described first step is removed. Although in this step an electric charge remains on the highly insulating film 13, as a result of the surface potential, a positive electric charge exists in the interface between the photoconductive layer 12 and the conductive support member 11 in the dark portion, for example, and therefore, no potential difference occurs, with the result that the surface potential becomes zero and there is no potential contrast.

In the third step, the photosensitive member 1 subjected to the second step is uniformly illuminated by means of the post lamp 6, when the light portion gives rise to no substantial variation, since the same has been once exposed, whereas the dark portion gives rise to a decrease of the resistance value of the photoconductive layer 12, which causes movement of the electric charge, so that the positive electric charge on the conductive support member 11 and the negative electric charge on the rear surface of the highly insulating film 13 are offset to cause a variation of a potential, with the result that a surface potential contrast of the light portion and the dark portion is established. Upon completion of these three steps, an electrostatic image associated with the original copy placed on the original copy table 4 is formed on the surface of the photosensitive member 1.

The photosensitive member 1 is then subjected to a developing process in a developing apparatus 7 by means of a magnetic brush dusted with a toner. The toner image thus developed is moved to a transfer corona discharge apparatus 8, where the toner image is transferred to a paper sheet as fed from a paper cassette 16 stocking paper sheets by means of upper and lower paper feed rollers 17 and 18. The paper sheet on which the toner image is transferred is separated from the photosensitive member 1 by means of a separating roller 14 and is then fed to a fixing roller 15. The fixing roller 15 serves to heat the toner image as transferred onto the paper sheet, thereby to fix the toner image to the paper sheet. Upon passage of the fixing roller 15, the paper sheet is taken out of the apparatus.

On the other hand, the photosensitive member 1 passing the transfer corona discharge apparatus 8 reaches a charge removing corona discharge apparatus 9, where any electric charge remaining in the photosensitive member 1 after transfer of the toner image is removed.

At the same time, a toner remaining on the surface of the photosensitive member 1 after transfer of the toner image is also removed by means of a cleaning apparatus 10.

The present invention can be advantageously employed as an alternating current corona discharge apparatus for establishing an electrostatic image in an electrophotographic apparatus, with an excellent resultant effect; however, it is pointed out that the present invention can also be employed as a transfer corona discharge apparatus or an electric charge removing corona discharge apparatus. It is further pointed out that the present invention can also be employed in various applications, apart from the above described applications in an electrophotographic apparatus.

Figure 3:
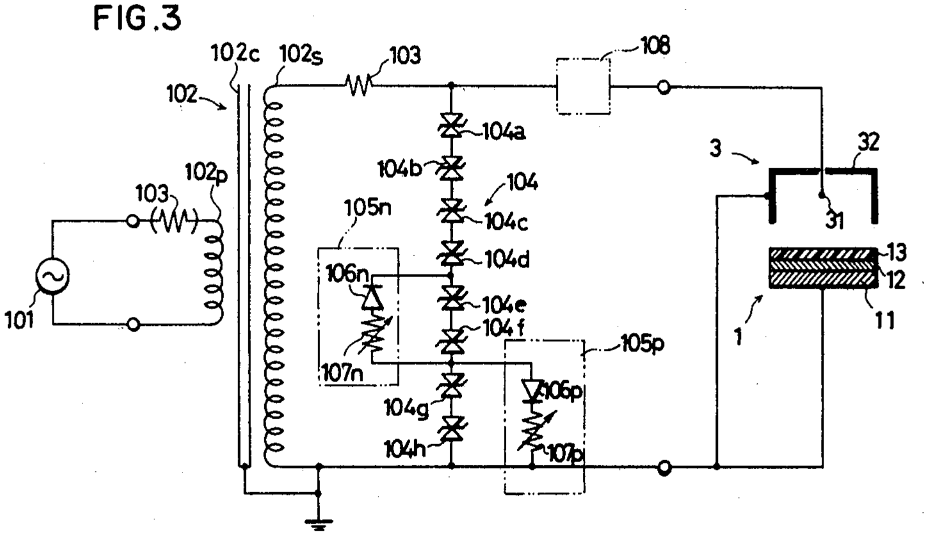
FIG. 3 is a schematic diagram of one embodiment of the present invention.

FIG. 3 is a schematic diagram of one embodiment of the present invention. An essential feature of the present invention resides in a power supply apparatus for applying a high alternating current voltage to a corona discharge apparatus as denoted by the reference numeral 3 in the FIG. 1 electrophotographic apparatus, for example. A power supply apparatus 100 of the embodiment shown in FIG. 3 is structured in the manner to be described in the following. A primary winding 102*p* of a power supply transformer 102 is connected to the commercial alternating current voltage source 101. A secondary winding 102*s* is coupled through an iron core 102*c* of the transformer 102 to the primary winding 102*p*. One end of the secondary winding 102*s* as well as the shield plate 32 of the discharge apparatus 3 and the conductive support member 1 of the photosensitive member 1 serving as a member being charged are connected to the ground. A non-grounded end i.e. a high voltage end of the secondary winding 102*s* is connected through a stablizing resistor 103 and an imbalancing circuit 108 to a wire electrode 31 of a corona discharge apparatus 3. A varistor circuit 104 is connected in parallel with the secondary winding 102*s* between the high voltage end and the grounded end of the secondary winding 102. The varistor circuit 104 comprises a series connection of, for example, eight varistors 104*a* to 104*h*. Each of these varistors 104*a* to 104*h* is a varistor of an operating voltage of about 1 kV. Such a varistor is commercially available as a high voltage varistor. Such a high voltage varistor may be a SiC varistor or any other type of a voltage responsive non-linear resistance characteristic device. A partial series connection including two varistors 104*g* and 104*h* of the varistor circuit 104 is shunted by a series connection 105*p* of a diode 106*p*, with the cathode at the ground side, and a variable resistor 107*p*. A partial series connection of the varistors 104*e* and 104*f* of the varistor circuit 104 is similarly shunted by a series connection 105*n* including a diode 106*n*, with the anode at the ground side, and a variable resistor 107*n*.

Figure 4:
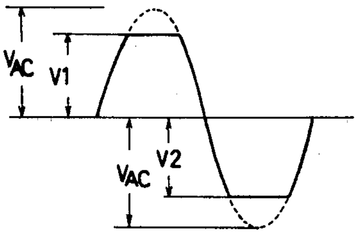
FIG. 4 shows a waveform of the output voltage of the power supply apparatus of the FIG. 3 embodiment.

In operation, a high alternating current voltage as induced in the secondary winding 102*s* of the power supply transformer 102 shows a peak value as shown as $V_{AC}$ by a dotted line in FIG. 4. The peak value $V_{AC}$ is 11.3 kV, for example. However, since the secondary winding 102*s* is shunted by the varistor circuit 104, the voltage developed across the secondary winding 102*s* is subjected to an operation of the varistor circuit 104. More specifically, if and when the voltage developed across the secondary winding 102*s* exceeds a response voltage or an operating voltage of the varistor circuit 104, say approximately 8 kV in the embodiment shown, which voltage level may also be termed a threshold voltage, then the resistance value of the varistor circuit 104 suddenly decreases and accordingly the peak value of the voltage developed across the secondary winding 102*s* is limited as shown by a solid line in FIG. 4. Accordingly, a high frequency component or a pulsating component occurring in superposition on the peak portion in the positive or negative direction of the alternating current as shown by the dotted line in FIG. 4 is prevented from being applied to the corona discharge apparatus 3.

In the embodiment shown, portions of one or more varistors in the varistor circuit 104, such as the varistors 104*g* and 104*h*, and the varistors 104*e* and 104*f*, are each shunted by series connections 105*p* and 105*n*, respectively. In case where the non-grounded end of the secondary winding 102*s* is positive, i.e. during the positive half cycle of the alternating current voltage, the peak value V1 shown in FIG. 4 can be freely changed within a variable range of the variable resistor 107*p* by adjusting the variable resistor 107*p* included in the series connection 105*p*. Similarly, the grounded end of the secondary winding 102*s* is negative, i.e. during the negative half cycle of the alternating current voltage, the peak value V2 shown in FIG. 4 can be varied by adjusting the variable resistor 107*n* included in the series connection 105*n*.

Thus, according to the FIG. 3 embodiment, the high alternating current voltage obtained from the voltage source 100 is limited at a predetermined peak value and the high alternating current voltage as limited at a predetermined peak value is applied to the corona discharge apparatus 3. It is convenient to speak of the limiting of the alternating current voltage of the present invention as being "sliced off" to each predetermined peak value (as shown, for instance, by V1 and V2 in FIG. 4). As a result, any unfavorable influence caused by a high frequency component in superposition on the peak in the positive or negative direction of the corona discharge current is totally eliminated and stabilized corona discharge is performed. According to the FIG. 3 embodiment, the peak value V1 as limited for the positive half cycle and the peak value V2 as limited for the negative half cycle can be separately and independently adjustable. Therefore, if and when the FIG. 3 embodiment is employed in an electrophotographic apparatus, a charge efficiency of the surface of the member being charged, i.e. the photosensitive member 1 (see FIG. 3) can be readily adjusted to a desired value.

In case where the inventive alternating current corona discharge apparatus is employed in an electrophotographic apparatus, the discharge apparatus is preferably structured such that the negative half cycle corona discharge is more dominant as compared with the positive half cycle corona discharge. To that end, only the series connection 105*p* may be provided, while the other series connection 105*n* may be omitted. In such instance, the peak value V2 is constant and only the peak value V1 can be varied by means of the variable resistor 107*p*. Accordingly, adjustment may be made such that the peak value V1 be smaller than the peak value V2 by adjusting the variable resistor 107*p*.

Figure 5A:
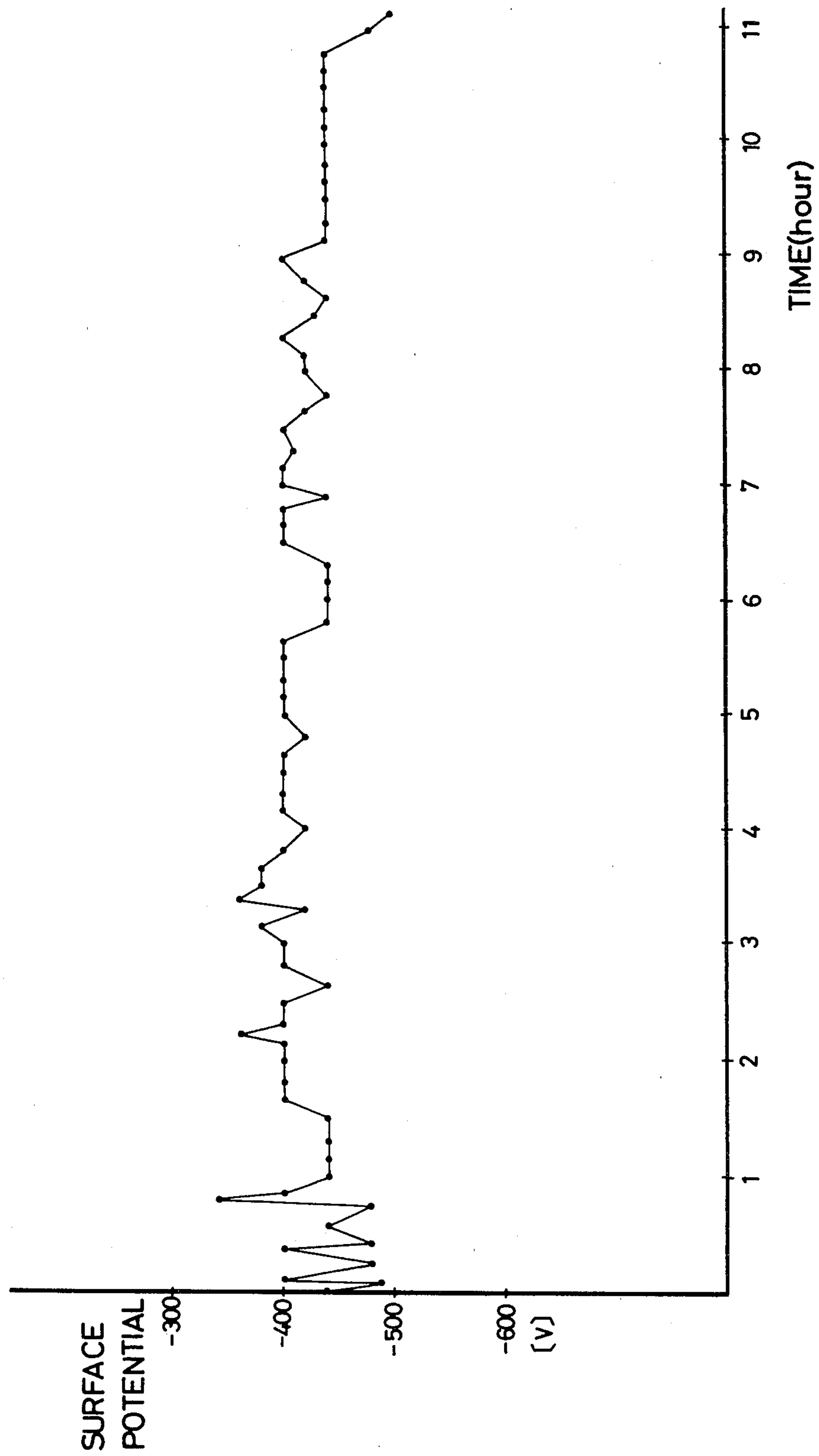
FIG.5A PRIOR ART
Figure 5B:
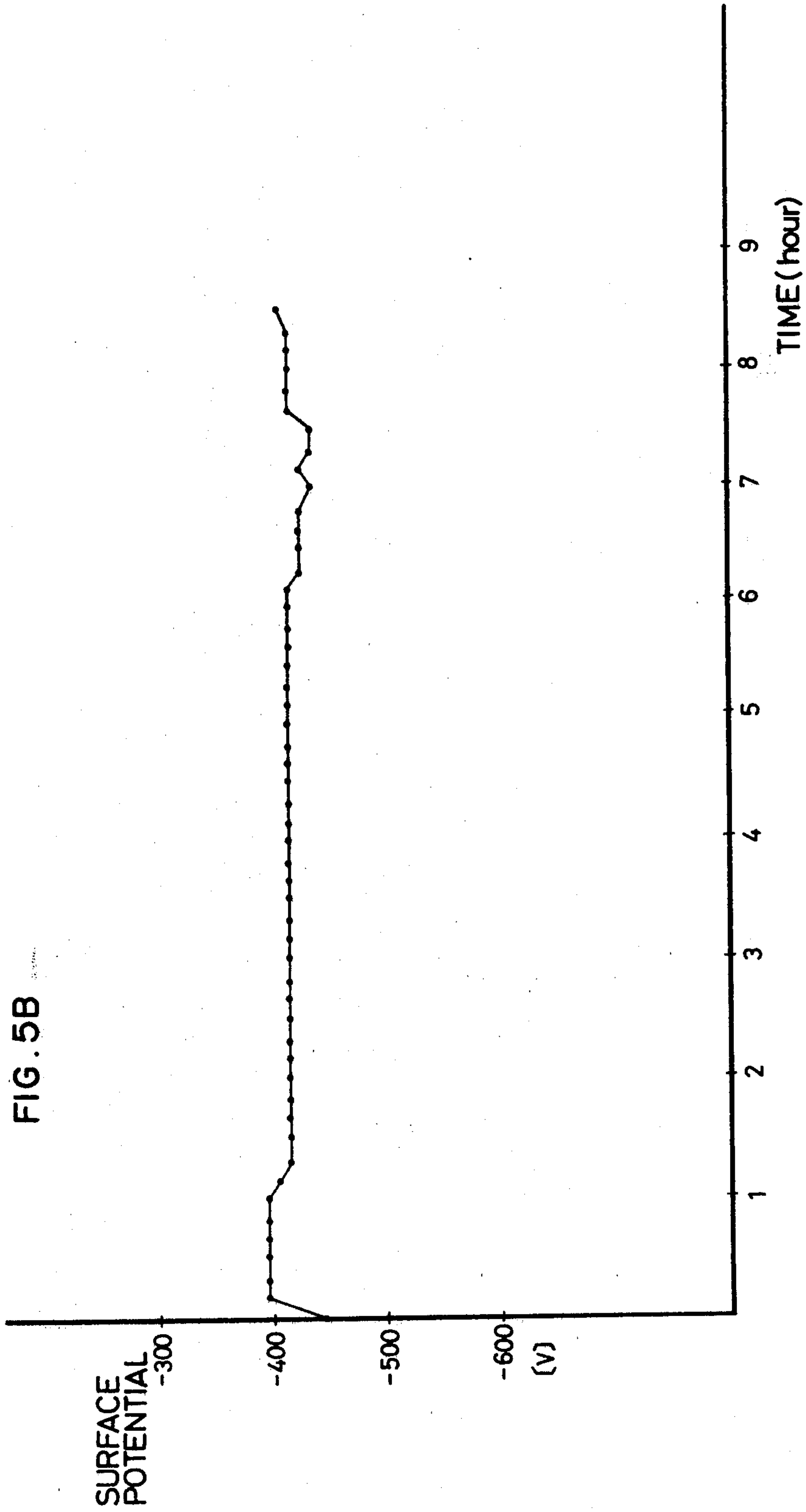

Referring to FIGS. 5A and 5B, the effect of the present invention will be described. FIG. 5A is a graph showing a variation of the surface potential in case where an electric charge is imparted to a member being charged such as a photosensitive member of an electrophotographic apparatus, for example, by means of a conventional alternating current corona discharge apparatus, without employing the present invention, and FIG. 5B is a graph showing a variation of the surface potential on a member being discharged by means of an alternating current corona discharge apparatus employing the present invention. It has been observed that when an electric charge is imparted continually by an alternating current corona discharge the surface potential on the member being charged becomes saturated at the value associated with the output voltage of the alternating current voltage and when the output voltage of the alternating current voltage source fluctuates, the surface potential on the member being charged promptly fluctuates in association with the fluctuation of the output of the alternating current voltage source. Accordingly, the stability of the high alternating current voltage source can be observed by measuring the surface potential on the member being charged as shown in FIGS. 5A and 5B. Referring to FIGS. 5A and 5B, it is seen that although a conventional alternating current corona discharge apparatus shows a maximum fluctuation of about 160 V in terms of the surface potential, the alternating current corona discharge apparatus of the present invention restricts the maximum fluctuation to about 50 V in terms of the surface potential of the member being charged. From the foregoing description, it would be appreciated that the inventive alternating current corona discharge apparatus significantly stabilizes the discharge.

Figure 6:
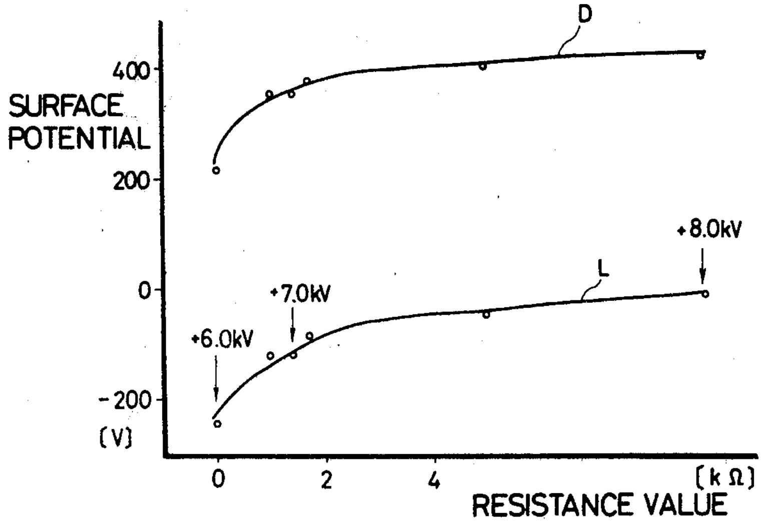
FIG. 6 is a graph showing a surface potential of a member being charged when the resistance of the variable resistor 107*p* is varied in the FIG. 3 embodiment.

FIG. 6 shows a surface potential on a member being charged, with the resistance value of the variable resistor 107*p* as a parameter, by adjusting the variable resistor 107 constituting the series connection 105*p* shown in FIG. 3. The FIG. 6 graph shows that, by adjusting the variable resistor 107*p* or 107*n*, the surface potential on the member being charged can be freely adjusted with high stability.

More specifically, FIG. 6 shows a case where the present invention is employed in an electrophotographic apparatus forming an electrostatic image through the above described three steps described with reference to FIGS. 1 and 2, wherein the member being charged corresponds to the photosensitive member 1. Referring to FIG. 6, the ordinate denotes a surface potential of the photosensitive member 1 and the abscissa denotes a resistance value of the variable resistor 107*p*. The line L in FIG. 6 denotes the surface potential at the light portion as exposed in the second step and the line D denotes the surface potential at the dark portion as not exposed. Thus, FIG. 6 shows a variation of the surface potential when the resistance value of the variable resistor 107*p* is adjusted so that the peak value V1 shown in FIG. 4 is changed from 6.0 kV to 8.0 kV. In such instance, the variable resistor 107*n* is set such that the peak value V2 as shown in FIG. 4 may be −8.0 kV.

Figure 7:
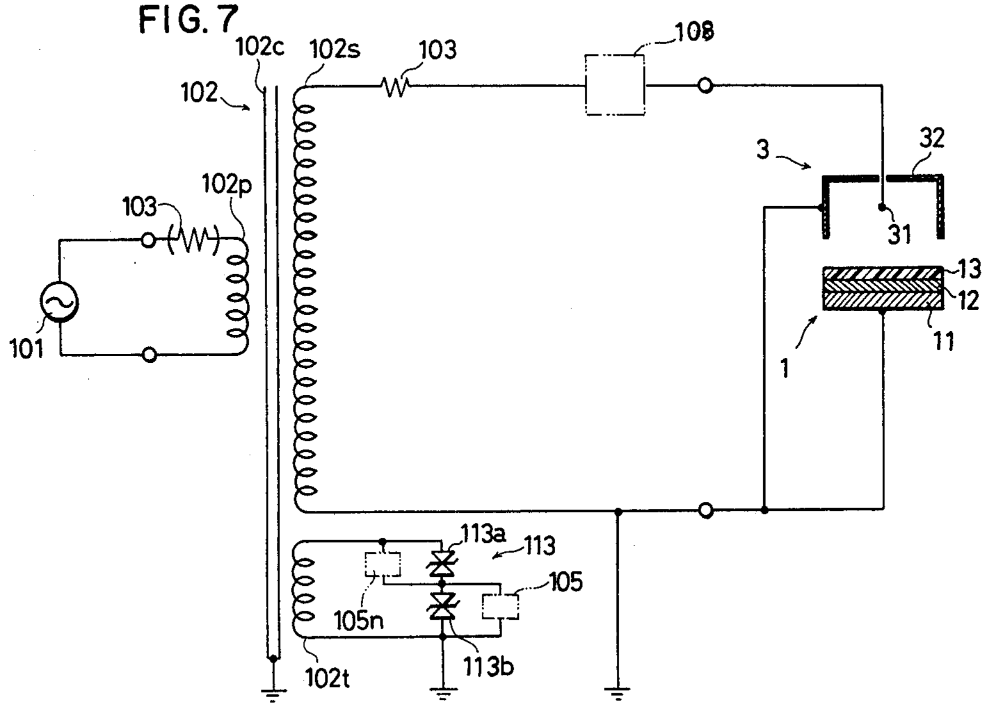
FIGS. 7, 8 and 9 show schematic diagrams of further embodiments of the present invention.

FIG. 7 is a schematic diagram of another embodiment of the present invention. The embodiment shown can be implemented using varistors of a smaller withstand voltage. More specifically, a third winding 102*t* is coupled to the iron core 102*c* of the power supply transformer 102. The voltage across the secondary winding 102*s* is applied through the imbalancing circuit 108 to the corona discharge apparatus 3. The third winding 102*t* is shunted by the varistor circuit 113 serving as a load of the third winding 102*t*. The varistor circuit 113 comprises a series connection of, for example, two varistors 113*a* and 113*b*, in which these varistors 113*a* and 113*b* may be of a withstand voltage which is as small as the order of 1/10 to 1/100 as compared with those varistors 104*a* to 104*h* described in conjunction with the FIG. 3 embodiment. One varistor 113*b* is shunted by a series connection 105*p*, while the other varistor 113*a* is shunted by a series connection 105*n*. According to the embodiment shown, the high alternating current voltage induced at the secondary winding 102*s* is limited to a predetermined peak value, as seen in FIG. 4, by means of the varistor circuit 113 serving as a load of the third winding 102*t*. More specifically, if and when the voltage as induced in the third winding 102*t* reaches the operating voltage of the varistor circuit 113, the output voltage of the third winding 102*t* is kept constant at the voltage. The above described limitation of the voltage as induced at the third winding 102*t* influences the voltage as induced at the secondary winding 102*s*, whereby the limiting function is performed.

Figure 8:
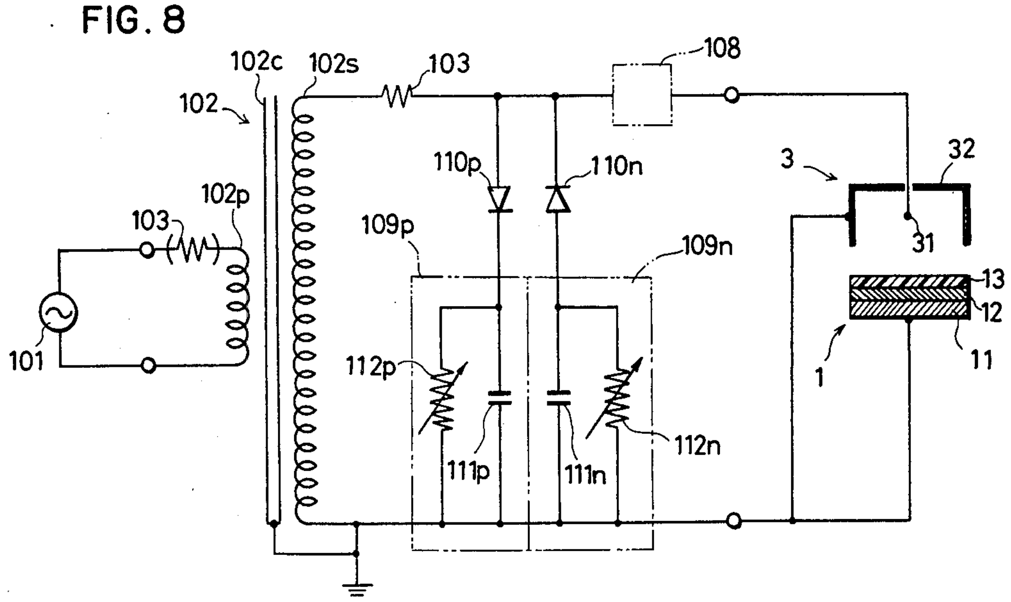

It is pointed out that for the purpose of decreasing the withstand voltage of the varistor, a center tap may be provided to the secondary winding 102*s*, as in the case of the FIG. 7 embodiment, and the varistor circuit 104 and series connections 105*p* and 105*n* as shown in FIG. 3, for example, may be connected between the center tap and the grounded end of the secondary winding 102*s*. In other words, the embodiments shown in FIGS. 3, 7 and 8 are substantially the same in terms of an equivalent circuit configuration thereof. This means that substantially the same operation can be performed even when the primary winding of the transformer is shunted by such a varistor circuit. In other words, either in the case that varistor circuits 104 and 113 and the resistor 103 employed in the above described embodiments are connected to the primary winding of the power supply transformer 102 or in case where the same are connected to the secondary winding of the power transformer 102, or in the case where the same are connected to the third winding, substantially the same circuit operation and the limiting function are performed, except that the specific values of the voltage and current are slightly different. Accordingly, it is intended that the present invention covers such modifications.

As discussed above, FIG. 8 shows a schematic diagram of a further embodiment of the present invention. In the embodiment shown, the secondary winding 102*s* of the power supply transformer 102 is shunted by a series connection of a constant or reference voltage source 109*p* and a diode 110*p*, with the cathode at the ground side, and by a series connection of a constant voltage source 109*n* and a diode 110*n*, with the cathode at the non-grounded side. Both the constant voltage sources 109*p* and 109*n* comprise a capacitor 111*p* and a variable resistor 112*p*, and a capacitor 111*n* and a variable resistor 112*n*, respectively. The constant voltage sources 109*p* and 109*n* may comprise merely direct current voltage sources.

In operation, if and when the non-grounded end of the secondary winding 102*s* of the transformer 102 is positive, i.e. in the positive half cycle of the alternating current voltage, the capacitor 111*p* included in the constant voltage source 109*p* is charged through the diode 110*p*. When the capacitor 111*p* is charged and saturated, the electric charge is discharged through the variable resistor 112*p*. Accordingly, the output voltage of the voltage source 109*p* is limited at the value determined by the charge voltage of the capacitor 111*p*. Conversely, if and when the non-grounded end of the secondary winding 102*s* of the power supply transformer 102 is negative, i.e. in the negative half cycle of the alternating current voltage, the constant voltage source

109*n* and the diode 110*n* operate. Accordingly, the output of the power supply circuit 110, i.e. the alternating current voltage being applied to the corona discharge apparatus 3, is limited in the manner similar to that shown in FIG. 4. Thus, the peak value V1 can be adjusted by the variable resistor 112*p* and the peak value V2 can be adjusted by the variable resistor 112*n*, respectively, within given ranges.

Figure 9:
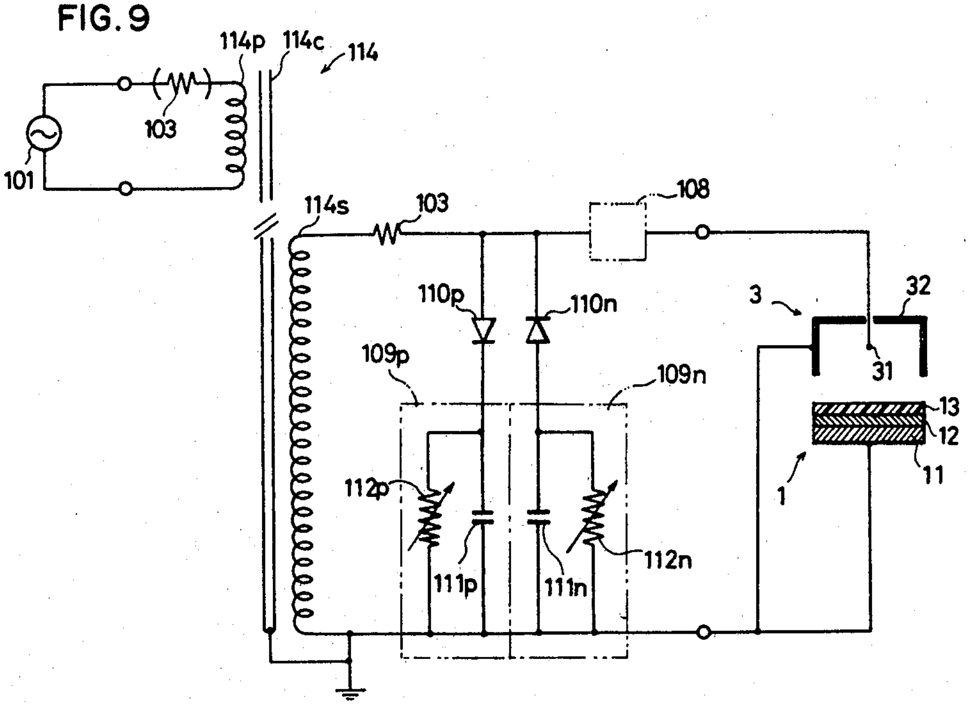

FIG. 9 shows a schematic diagram of still a further embodiment of the present invention. The embodiment shown is different from the embodiments described previously in that a leakage transformer is employed as a power supply transformer. It is well known that such leakage transformer 114 exhibits a constant current characteristic wherein a constant current is caused to flow irrespective of fluctuation of a load thereof. Accordingly, a leakage transformer can be advantageously employed in a high alternating current voltage source for a corona discharge apparatus.

Figure 10:
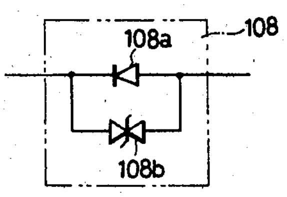
FIG. 10 is a schematic diagram showing one example of the imbalancing circuit 108.
Figure 11:
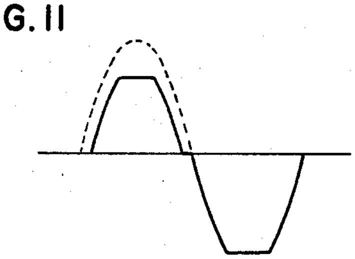
FIG. 11 shows waveforms of the output of the power supply apparatus employing the imbalancing circuit shown in FIG. 10.

FIG. 10 is a schematic diagram of one example of the imbalancing circuit 108. The imbalancing circuit 108 of the embodiment shown comprises a parallel connection of a diode 108*a* and a varistor 108*b*. With such a circuit configuration, the output of the power supply circuit of the embodiments shown in FIGS. 3, 7, 8 and 9 gives rise to a voltage drop only in a positive half cycle of the alternating current voltage, as shown in FIG. 11, by virtue of the varistor 108*b*. Accordingly, the voltage is relatively dominant in the negative half cycle. As a result, employment of such power supply enables a stabilized operation of an alternating current corona discharge apparatus.

Figure 12:
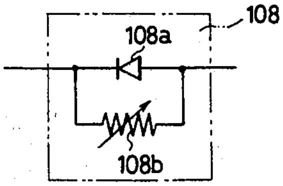
FIG. 12 is a schematic diagram of another embodiment of the imbalancing circuit.
Figure 13:
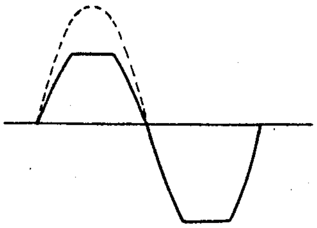
FIG. 13 shows a waveform of the output of the power supply apparatus employing the FIG. 12 imbalancing circuit.

FIG. 12 is a schematic diagram of another embodiment of the imbalancing circuit 108. The embodiment shown comprises a parallel connection of a diode 108*a* and a variable resistor 108*c*. According to the embodiment shown, as shown in FIG. 13, a voltage drop is caused by means of the variable resistor 108*c* with respect to the positive half cycle voltage of the alternating current voltage obtained from the power supply circuit 100 shown in FIGS. 3, 7, 8 and 9, so that relatively the positive half cycle is less dominant with respect to the negative half cycle.

Although in the foregoing description, the embodiments were described as employing a commercial power supply as the alternating current voltage source, alternatively an alternating current voltage source of the frequency of say 200Hz may be provided in the case where the present invention is employed in a discharge apparatus for an electrophotographic apparatus. In such instance, a better electrostatic image of less charge uneveness can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An alternating current (AC) corona discharge apparatus, comprising corona discharge electrode means for supporting said discharge, high AC voltage supply means for supplying a high AC voltage having a waveform with positive and negative going half cycles to said corona discharge electrode means, adjustable slicing off means coupled to said high AC voltage supply means for limiting the peak portion of at least one of the positive and negative going half cycles of the waveform of said high AC voltage to at least one respective selected limit value, and limiting involving selectively slicing off the peak portion of at least one of said positive and negative half cycles of the waveform at the respective limit value, wherein the maximum absolute value of the positive half cycle of a high AC voltage that is applied to the corona discharge electrode means may be adjusted to be smaller than the maximum of the absolute value of the negative half cycle, without substantially varying the effective value of the high AC voltage being supplied to the said corona discharge electrode means.

2. The apparatus of claim 1, wherein said adjustable slicing off means comprises means for adjustably setting the respective limit value for the positive half cycles of said waveform to an absolute value that is less than that of the peak value of the negative half cycles.

3. The apparatus of claim 2, wherein said adjustable slicing off means comprises means for setting the respective limit value for the negative half cycle of said alternating current voltage to a higher absolute value than that of the limit value of the positive half cycles.

4. The apparatus of claim 2 or 3, wherein said adjustable slicing off means comprises a constant voltage device circuit for providing at least one operating voltage corresponding to said at least one limit value.

5. The apparatus of claim 4, said constant voltage device circuit comprising series connected varistors.

6. The apparatus of claim 4, wherein said constant voltage device circuit comprises a series connection of a plurality of constant voltage devices, whereby each said operating voltage is borne in a divided manner by said plurality of constant voltage devices.

7. The apparatus of claim 6, further comprising at least one shunt means coupled in a shunt fashion to a respective portion of said series connection of said plurality of constant voltage devices for adjusting the fraction of said operating voltage being borne by said respective portion of said series connection for a respective one of said half cycles, each said respective portion including at least one of said constant voltage devices, wherein each said shunt means is for adjusting a respective one of said at least one limit value.

8. The apparatus of claim 7, wherein each said shunt means for adjusting said fraction of said operating voltage comprises a diode and a variable resistor connected in series across said respective portion of said series connection of said plurality of constant voltage devices.

9. The apparatus of claim 6, wherein each said constant voltage device comprises a voltage responsive non-linear resistance device.

10. The apparatus of claim 6, said constant voltage devices comprising series connected varistors.

11. The apparatus of claim 1, wherein said adjustable slicing off means comprises at least one reference voltage source means for generating a reference voltage corresponding to said at least one limit value for a respective one of said half cycles, and a respective means including a diode connected to each said reference voltage source means for blocking the other half cycles.

12. The apparatus of claim 11, wherein each said reference voltage source means comprises a capacitor connected in parallel with an adjustable resistor for providing at least one operating voltage corresponding to a respective one of said at least one limit value.

13. The apparatus of claim 1, 2, 3, 11 or 12, said high AC voltage supply means comprising a low AC voltage source for generating a low AC voltage, and a transformer coupled to said low AC voltage source for transforming said low AC voltage to said high AC voltage.

14. The apparatus of claim 13, wherein said transformer comprises a primary winding coupled to said low AC voltage source, and a secondary winding coupled to said primary winding for providing said high AC voltage.

15. The apparatus of claim 14, wherein said adjustable slicing off means is coupled to said primary winding of said transformer.

16. A corona discharge apparatus in accordance with claim 14, wherein said adjustable slicing off means is coupled in parallel with said secondary winding of said transformer.

17. A corona discharge apparatus in accordance with claim 16, wherein each said operating voltage is such that the peak value of the AC voltage induced in said secondary winding corresponds to a respective one of said at least one limit value.

18. The apparatus of claim 17, wherein said adjustable slicing off means comprises at least one reference voltage source means for generating a reference voltage corresponding to the respective limit value of the respective ones of said positive and negative half cycles, and a respective diode coupled to each said reference voltage source means, each said reference voltage of each said reference voltage source means being selected such that the corresponding peak value of said AC voltage induced in said secondary winding corresponds to the respective limit value.

19. The apparatus of claim 14, wherein a third winding is coupled to said transformer , and said adjustable slicing off means is coupled in parallel with said third winding.

20. The apparatus of claim 13, said apparatus comprising an imbalancing circuit connected between the high voltage side of said corona discharge means and said voltage supply means.

21. The apparatus of claim 20, said imbalancing circuit comprising a parallel connection of a variable resistor and a diode.

22. The apparatus of claim 20, said imbalancing circuit comprising a parallel connected thyristor and diode.

23. The apparatus of claim 13, said transformer comprising a leakage transformer.

24. The apparatus of claim 1, said adjustable slicing off means comprising series connected varistors.

25. The apparatus of claim 1, 2, 3, 11 or 12, comprising an imbalancing circuit connected between the high voltage side of said corona discharge apparatus and said voltage supply means.

26. The apparatus of claim 25, said imbalancing circuit comprising a parallel connected variable resistor and a diode.

27. The apparatus of claim 25, said imbalancing circuit comprising a parallel connected thyristor and diode.

* * * * *

UNITED STATES PATENT AND TRADEMARK OFFICE
CERTIFICATE OF CORRECTION

PATENT NO. : 4,339,783

DATED : July 13, 1982

INVENTOR(S) : Kinashi et al.

It is certified that error appears in the above-identified patent and that said Letters Patent is hereby corrected as shown below:

Column 10, line 6, "and" should read
-- said --.

Signed and Sealed this

*Tenth* Day of *May 1983*

[SEAL]

*Attest:*

GERALD J. MOSSINGHOFF

*Attesting Officer* *Commissioner of Patents and Trademarks*